Aug. 21, 1934.   H. T. LANGABEER ET AL   1,970,939
TELEPHONE POWER PLANT
Filed July 31, 1931   4 Sheets-Sheet 1

INVENTORS H. T. LANGABEER
R. L. LUNSFORD
BY
ATTORNEY

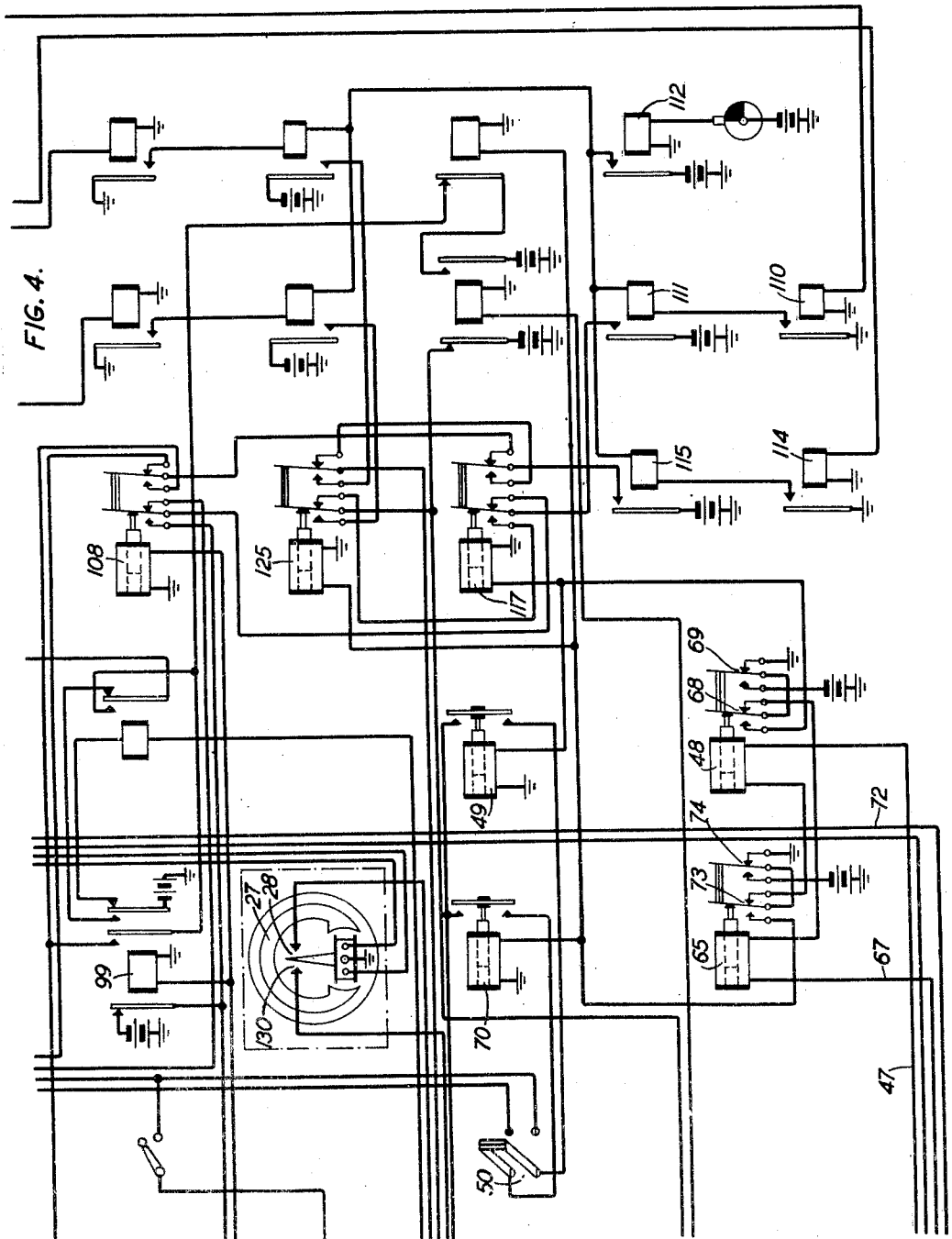

Patented Aug. 21, 1934

1,970,939

UNITED STATES PATENT OFFICE 1,970,939

TELEPHONE POWER PLANT

Harvey T. Langabeer, South Ozone Park, N. Y., and Robert L. Lunsford, Belleville, N. J., assignors to Bell Telephone Laboratories, Incorporated, New York, N. Y., a corporation of New York Application July 31, 1931, Serial No. 554,222

2 Claims. (Cl. 171—314)

This invention relates to automatic regulating systems for electric generators used in connection with a floating storage battery and more particularly to systems for controlling the connection of a plurality of generators to the load circuit of the system in accordance with the requirements of the load.

The principal object of the invention is to secure reliable automatic control of system of the above mentioned character.

Another object is to automatically start and stop motor generator sets as required in accordance with, and under control of, the load circuit current.

Another object is to prevent simultaneous starting of two or more motor generator sets upon the return of the power supply following a power failure.

Another object is to disconnect any one of the motor generator sets from service at will and to transfer the automatic control of that set to the next set.

A still further object is to automatically regulate the voltage of each generator, supplying the load, within predetermined high and low limits and to prevent overloading of the generators under low battery voltage conditions.

Still another object is to automatically control a reserve generator set to function either as an additional load supplying machine or to charge the storage battery, normally floating across the load circuit, when the battery has reached a predetermined discharged condition and to maintain the voltage of the charging current constant within a predetermined range.

Additional features of the invention will appear from a consideration of the following description taken in connection with the accompanying drawings.

Figure 1:
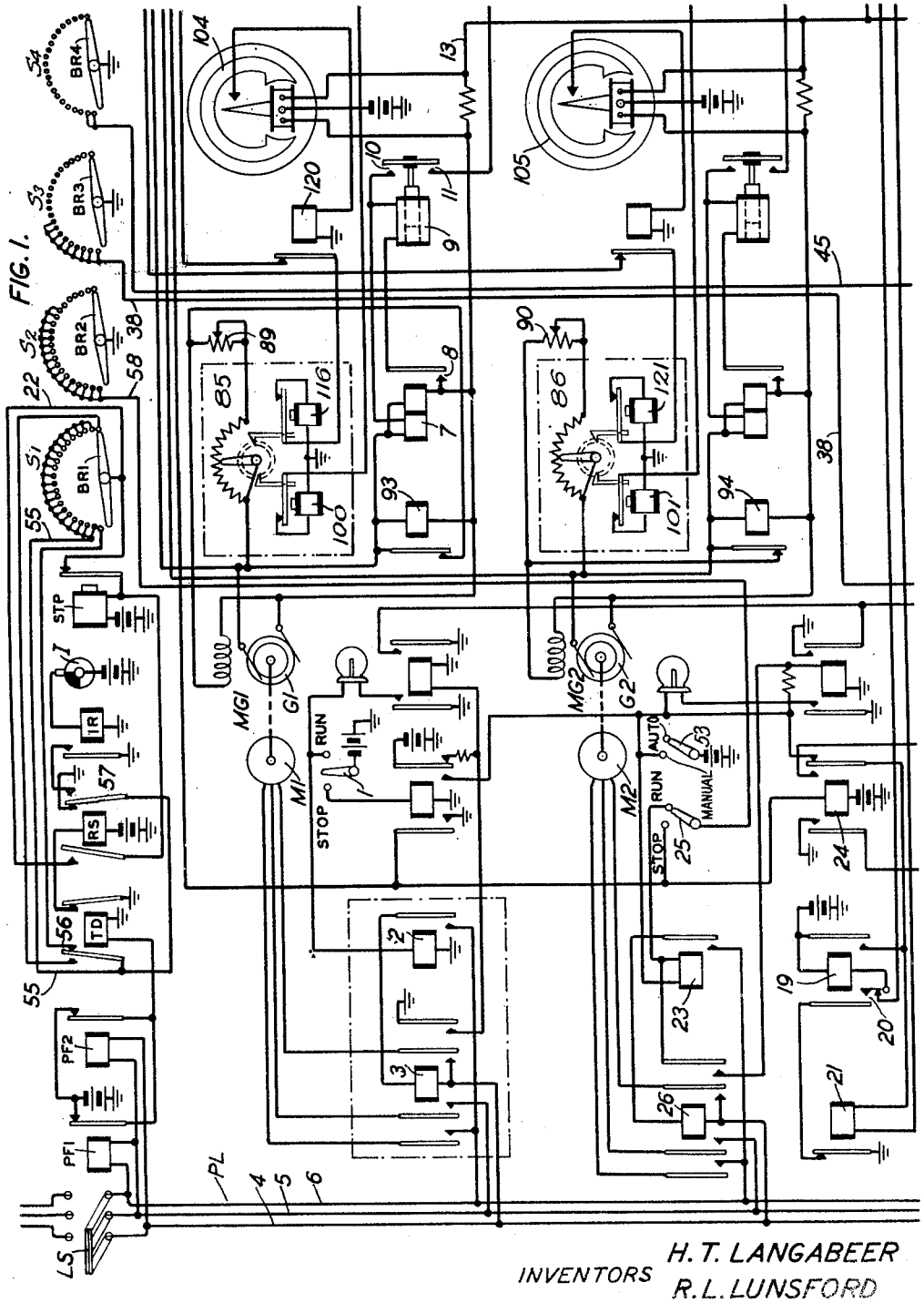
Figure 2:
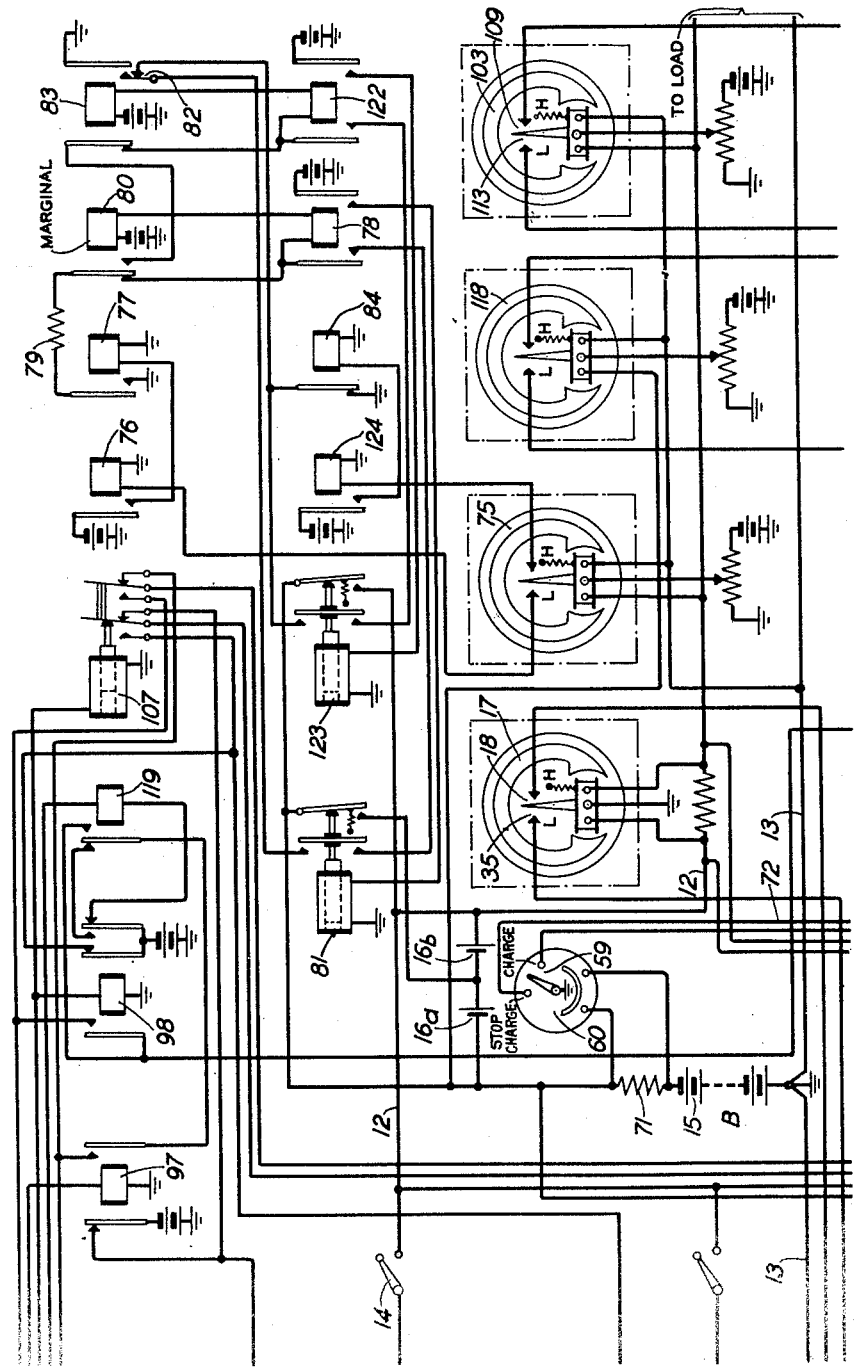
Figure 3:
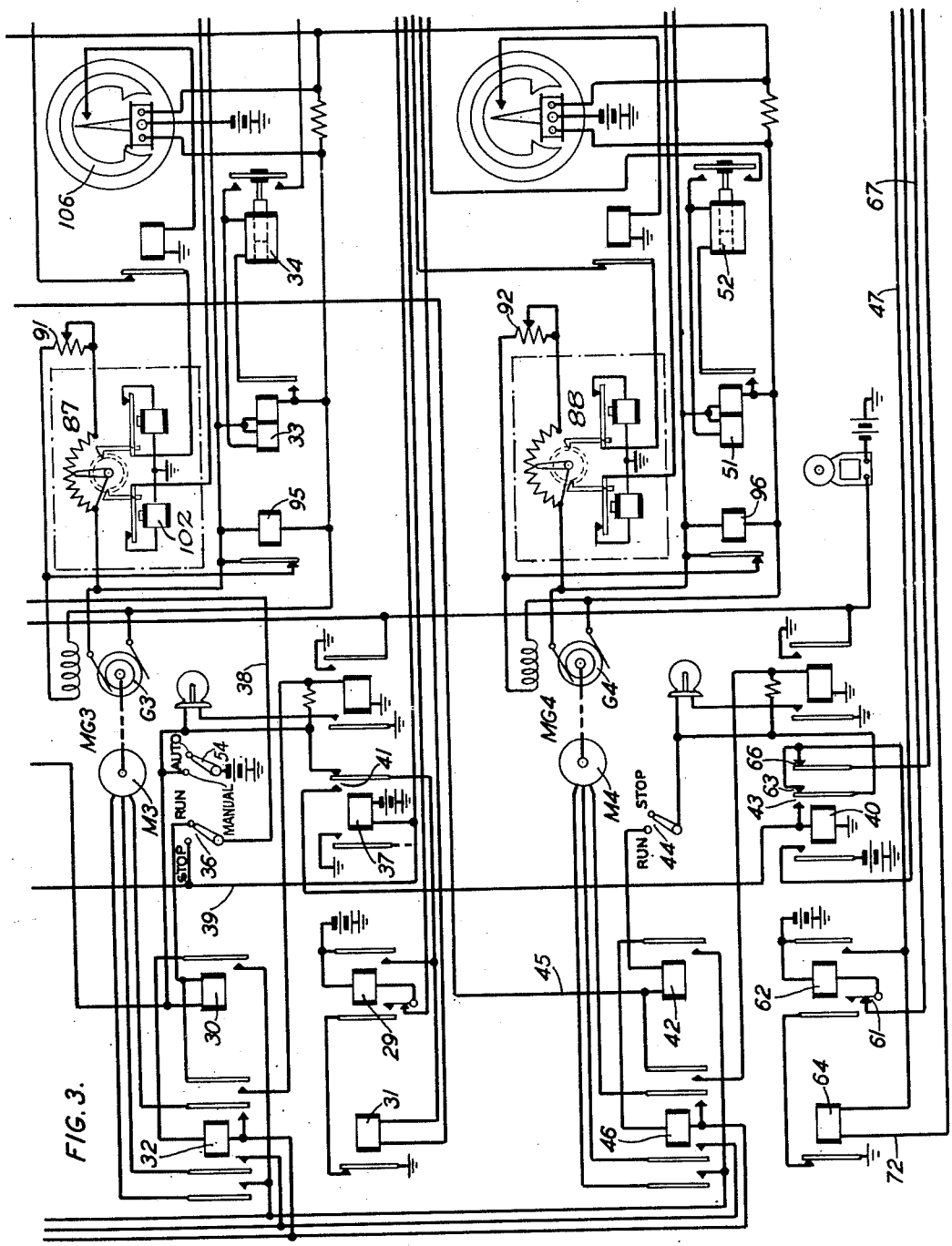

The accompanying figures of the drawings, Figs. 1, 2, 3 and 4 when placed together with Fig. 2 to the right of Fig. 1 and Figs. 3 and 4 below Figs. 1 and 2 respectively, represent an automatic regulating system in accordance with the invention.

Referring to the drawings, PL is a power line supplying energy to operate the motors M1, M2, M3 and M4 of the motor generator sets MG1, MG2, etc. The generators G1, G2, etc., of the motor generator sets supply direct current to the load circuits in parallel wtih floating storage battery 15 connected in series with counter E. M. F. cells 16a and 16b.

A description of the operation of the system will now be given.

When line switch LS is closed, relays PF1 and PF2 operate, thereby releasing relays TD and RS which, up to this time, had been operated. With these last mentioned relays released, when the interrupter operated relay IR operates again, a circuit is completed for the stepping relay STP which controls the brushes BR1, BR2, BR3 and BR4. This circuit may be traced from ground, front contacts of relay IR, back contacts of relays RS and TD, the first right hand contact and brush BR1 of the selector, conductor 22, lefthand back contacts of relay RS and winding of relay STP to battery. Relay STP energizes and moves all the brushes BR1, BR2, etc. one step in a counter-clockwise direction. Subsequently, each time interrupter relay IR operates and releases, relay STP operates and releases moving all the brushes BR1, BR2, etc. one step in a counter-clockwise direction at each operation until they reach the last or 22nd contact where they stop due to the open circuit at contacts 56 of relay TD. The circuit for operating the stepping relay STP to step the brushes ahead is traced from battery, winding of relay STP, left back contacts of relay RS, brush BR1, strapped contacts 2 to 21 of the bank associated with brush BR1, conductor 55, right-hand normal contacts of relay RS and left-hand contacts of interrupter relay IR when that relay periodically operates, which in practice may be once every six seconds under control of a constantly operating interrupter I. As long as switch LS remains closed and the power line PL is alive, the selector will remain in this position.

It will now be assumed that charging generator G1 is intended to operate continuously and supply current to the load circuit up to the limit of its capacity. The operation of the control of this generator is as follows: Moving the contact arm of switch 1 to the right-hand position completes an obvious circuit to energize relay 2 which connects relay 3 across conductors 4 and 6 of the power line PL. Relay 3 operates and in turn connects the motor M1 across the power line. Motor M1 thereupon starts and drives direct current generator G1. Bridged across the output of G1 is the right-hand winding of double-wound relay 7 which operates when the voltage delivered by G1 attains a predetermined value. Relay 7 thereupon closes its contact 8 and bridges the solenoid circuit breaker 9 across the generator circuit. This device thereupon operates and closes its contacts and connects the output of G1 to the load circuit conductors 12 and 13 through the switch 14 which is normally closed when the system is in operation. Bridged across the load circuits 12 and 13 is a storage battery 15, in series with a group of counter E. M. F. cells 16. This battery, under normal conditions, floats on the line in a fully charged condition in readiness to supply all or any part of the load in the case of a failure to the generating apparatus. Regulation of this storage battery will be considered in detail, later.

*Increasing load*

In series with conductor 12 of the load circuit is connected an ammeter relay 17 so arranged and adjusted that its contact 18 will be closed when the current in the load circuit reaches the full load rating of direct current generator G1. This contact completes a circuit to energize relay 19 which relay in operating locks up over its contact 20 to ground at the back contact of relay 21. Relay 19 in operating also completes a circuit to energize relay 23 which can be traced from battery, the right-hand contacts of relay 19, right-hand back contact of relay 24, winding of relay 23, switch 25, the twenty-second or extreme left hand contact and brush BR2 of the selector S2 to ground. Relay 23 in operating completes the circuit of relay 26, which in operating connects the motor M2 across the power line PL. Direct current generator G2 thereupon is brought up to speed and connected across the load circuit in exactly the same manner as previously described in connection with G1.

When the discharge load rises to the sum of the ampere ratings of generators G1 and G2, ammeter relay 27 closes its contact 28 to operate relays 29 and 30 to start motor generator set MG3 and add generator G3 in parallel with generators G1 and G2.

*Decreasing load*

When the load current decreases to slightly less than the sum of the ampere ratings of G1 and G2, the armature of ammeter relay 27 will open its contact 28 and close its contact 130 thereby completing an energizing circuit for relay 31 which can be traced from ground, contact 130 of ammeter relay 27, winding of relay 31 and right-hand contact of relay 29 to battery. Relay 31 operates and releases relay 29 which in releasing releases relays 31 and 30. Relay 30 in releasing releases relay 32 which disconnects motor generator MG3 from the line.

When the power supply to the motor M3 is disconnected, the generator G3 then draws current from the load circuit to operate it as a motor, thereby reversing the current flowing in the series or left-hand windings of relay 33 causing this relay to release which in turn releases the circuit breaker relay 34 which acts to disconnect generator G3 from the load circuit.

When the load current decreases to slightly less than the ampere rating of G1, the ammeter relay 17 will open its contact 18 and close its contact 35 thereby causing the operation of relay 21 and the release of relays 19, 21, 23 and 26 thus disconnecting the motor generator set MG2 from the power line PL and load in the same manner as described in connection with the disconnection of motor generator set MG3.

*Removing a motor generator from service*

To remove a motor generator set from service for any reason, such as maintenance or repairs, the associated control switch is operated to the left or stop position. For the purpose of describing the operation of this feature, let it be assumed that it is desired to remove motor generator set MG3 from service. Operating switch 36 to the left or stop position opens the circuit of relay 30 and closes a circuit to operate relay 37 which can be traced from ground on contact 22 of the bank of contacts associated with selector brush BR3, conductor 38, arm of switch 36 and conductor 39 to battery through the winding of relay 37. Relay 37 operated transfers the control, by ammeter relay 37, of motor generator set MG3 to the auxiliary motor MG4. Under this condition when ammeter relay 27 closes its contact 28 and operates relay 29, a circuit is completed to operate relay 40 instead of relay 30. This circuit is traced from battery, right-hand contact of relay 29, contact 41 of relay 37 and winding of relay 40 to ground. Relay 40 operated completes a circuit to operate relay 42 which can be traced from battery, right-hand contact of relay 29, contact 41 of relay 37, contact 43 of relay 40, the "run" contact of switch 44 (closed when the auxiliary machine MG4 is in service), winding of relay 42, conductor 45 to ground on the selector brush BR4, which, as before explained, is standing on contact 22 when the power line PL is alive and the switch LS closed. Relay 42 operates and closes the circuit of relay 46 which connects motor M4 to the power line. When relay 40 operated it also completed an obvious circuit over conductor 47 to operate relay 48. Relay 48, operated, completes a circuit to operate relay 49 which closes its contacts and connects generator G4 through switch 50 (closed when MG4 is in service) to the load circuit, when relay 51 and circuit breaker 52 operate in response to the attainment of a predetermined voltage by generator G4.

When the generator control switch 36 is returned to the "run" position, motor generator set MG3 will again operate under control of ammeter relay 27 and motor generator MG4 will be released.

*Manual control of motor generators*

To operate motor generator MG2 or MG3 continuously under manual control, instead of automatically, the associated manual control switch 53 or 54 is moved to the left or "Man" position thereby operating either relay 23 or 30 to initiate operation of the associated motor generator which will continue to run until the switch is returned to the "Auto" or right-hand position.

*Power failure*

In the event of a failure of the power supply and its restoration during a period when the load requires two or more generating machines, some means is necessary to prevent the simultaneous starting of all machines required and the consequent blowing out of fuses or operation of other protective devices. This condition is taken care of by the provision of a control circuit, which operates to start the required number of machines in succession with a sufficient delay interval between to overcome the above difficulty.

The operation of this control circuit is as follows: It will be remembered that at the beginning of the present description it was explained how the selector brushes BR1, BR2, etc. were stepped along from contact 1 to contact 22 provided the power line was alive. If it is now assumed that the power fails, relays PF1 and PF2 will release thereby completing an obvious circuit to operate relay TD which in turn will energize and operate relay RS. With relays TD and RS operated, a circuit is completed for the stepping relay STP which energizes and steps the selector brushes from contact 22 to contact 1. The circuit for operating STP is traced from battery, windings of relay STP, its interrupter contact, brush BR1, contact 22 of the selector, contact 56 of relay TD and contact 57 of relay RS to ground. When brush BR1 leaves contact 22 and reaches contact 1, this circuit is opened and therefore the brush will remain on contact 1 until the power is restored at which time the brushes will start and again step around to position 22 as previously described.

When the power restoration occurs, MG1 will start immediately over the previously closed contacts of relay 3. Motor generators MG2, MG3, etc. however, do not start again immediately due to the fact that they lost the operating ground for their respective relays 23, 30, etc. when selector brushes BR2, BR3, etc. moved out of position 22 at the time the power failed, as just described. The release of relays 23, 30, etc. under this condition, released relays 26, 32, etc. and opened the circuit to the motors M2, M3, etc.

If the contacts 18 of ammeter relay 17 are closed, relay 19 is operated, and when selector brush BR2 reaches the seventh position counting from the right, a circuit will be closed to operate relay 23. This circuit can be traced from ground on brush BR2, the last sixteen contacts of the selector, conductor 58, the contacts of switch 25, winding of relay 23, right-hand normal contacts of relay 24 and right-hand front contacts of relay 19 to battery. Relay 23 operates and closes a circuit for relay 26 which connects motor M2 to the power line which thereupon starts. Generator G2 is connected to the load circuit in the same manner as before described. If the contacts 28 of ammeter relay 27 are closed, relay 29 is operated, and when brush BR3 of the selector S3 reaches position 14, it will close a circuit to operate relay 30, similar to that described for relay 23. This causes motor generator MG3 to start. In like manner when brush BR4 of selector S4 reaches position 21 it will operate relay 42 in case contacts 59 of ampere hour meter 60 are closed thereby starting motor generator MG4. In this way it will be noted that the machines start one after the other at intervals, of the order of 42 seconds. This interval can be regulated by changing the strapping of the selector bank contacts or by changing the rate of operation of interrupter relay IR which may be controlled by interrupter I or other suitable timing device.

In the event of a momentary power failure at a time when the selector brushes BR1, BR2, etc. are between position 2 and 21 and are being stepped around by relay STP under control of relay IR and interrupter I, relays PF1 and PF2 will release causing relays TD and RS to operate. Relay RS opens its left-hand back contact thereby opening the normal operating circuit for relay STP under control of relay IR. When this occurs relay STP will operate intermittently to immediately step the brushes around to position 1. The operating circuit for relay STP under these conditions is traced from battery, winding of relay STP, its interrupter contact, brush BR1, strapped contacts in position 2 to 21 of selector, conductor 55, contact 57 of relay RS to ground.

*Automatic recharge*

In the event that storage batteries 15 become discharged a predetermined amount, which for example may be 10%, due to the power failure for example, at which time the batteries may be obliged to carry the entire load for a suitable period, the ampere hour meter 60, which is in circuit with battery 15, will have moved its contact arm into engagement with contact 59, thereby completing the circuit to start motor generator MG4. This circuit can be traced from ground, contact arm and contact 59 of ampere hour meter 60, contact 61 and winding of relay 62 to battery. Relay 62 operated closes a circuit to operate relay 42 which can be traced from battery, right-hand contact of relay 62, contact 63 of relay 40, the "run" contact of switch 44, winding of relay 42 and conductor 45 to ground on selector brush BR4 in position 22. Relay 62 in operating also locks over its left-hand contact to ground at the back contact of relay 64. Relay 42 operates relay 46 which in turn connects the motor M4 across the power line.

When relay 62 operated, the battery connected over its right-hand contact also completed an energizing circuit for the solenoid contactor 65 which can be traced from battery, right-hand contact of relay 62, contact 66 of relay 40, conductor 67, winding of contactor 65 and contacts 68 and 69 of contactor 48 to ground. The contactor 65 is operated and operates the contactor 70 thereby closing a circuit to connect the generator G4 directly across the battery to the exclusion of the counter E. M. F. cells 16a and 16b. This circuit can be traced from an upper brush of generator G4, left-hand winding of relay 51, contact of solenoid circuit breaker 52, contact of contactor 70, upper contact of line switch 50 (which is normally closed when the motor generator set MG4 is in service), to the upper terminal of battery 15 in series with shunt 71 of ampere hour meter 60. This circuit is completed when the generator G4 builds its voltage up to a predetermined voltage of say 21 volts and operates the first contactor 52.

When the ampere hour meter closes its left-hand or stop charge contacts, due to the battery being in a predetermined charge condition, relay 64 operates on a circuit which can be traced from the ground on the contact arm of meter 60, conductor 72, relay 64, to battery at the right contact of relay 62. Relay 64 operates and opens the holding circuit of relay 62 which in turn releases relays 42, 46, 65 and 70 thereby stopping the motor generator set MG4 and disconnecting generator G4 from the battery.

In case motor generator MG3, for example, is out of circuit and ammeter relay 27 closes its contact 28 while generator G4 is charging the battery, the charging operation will be interrupted and the generator transferred to assist in carrying the load as follows: When the contact 28 of ammeter relay 27 is closed, relay 29 operates and is locked up under control of relay 31 and completes the circuit to operate relay 40 which is traced from battery, right-hand contact of relay 29, contact 41 of relay 37 and winding of relay 40 to ground. Relay 40 operates and opens the circuit of solenoid contactor 65 which releases. Relay 40 in operating also prepared the circuit to operate contactor 48 which is completed when contactor 65 releases. This circuit can be traced from battery, left-hand contact of relay 40, a conductor 47, winding of contactor 48 and back contacts 73 and 74 of contactor 65 to ground. Contactor 65 in releasing also releases contactor 70. Contactor 48 in operating completes an obvious circuit to operate contactor 49, thereby connecting the generator directly across the load circuit instead of directly across the battery as in the prior case.

If when the load decreases to a point where G4 is not required to assist its carrying the load and the battery is still in a partially discharged condition, i. e., if the contact arm of ampere hour meter 60 is not in engagement with its left-hand or stop contact, relay 29 will release, thereby releasing relay 40 which releases contactor 48 and prepares a circuit to reoperate contactor 65 when contactor 48 releases. Contactor 48 releases contactor 49 and the operation of contactor 65 reoperates contactor 70 thereby transferring the output of generator G4 from the load circuit back to the previously described battery charging connection.

Voltage regulation

Each generator G1, G2, etc. is provided with an automatically operating field rheostat 85, 86, etc. connected in series with the associated hand-operated field rheostat 89, 90, etc. These hand rheostats are normally adjusted so that when all the resistance in the automatic rheostat is cut out, the generator will, at normal speed, deliver a predetermined voltage under full load conditions, for example, 23.5 volts.

The automatic rheostats may have sufficient resistance to regulate the voltage of their respective generators between certain predetermined low and high limits, for example, 23.25 volts to 23.75 volts all the way from no load to full load.

When their respective generators are not in operation, all the resistance of the automatic rheostats is in circuit, i. e., the brush arm is moved over to the extreme left-hand position by the action of magnets 100, 101, 102, etc. which are caused to step the brushes in a left-hand or counterclockwise direction, a circuit for which is completed to battery at contacts of the respective relays 97, 98, and 99 which are deenergized at this time.

Under normal conditions the contacts of relays 93, 94, etc., whose windings are connected directly across the terminals of their respective generators, short-circuit both of the associated field winding rheostats, thus giving the generator a full field. The relays 93, 94, etc. are so constructed that they will not operate below a certain predetermined voltage which in the present case can be assumed to be of the order of 15 volts. When any generator voltage, therefore, builds up to 15 volts, the respective relays 93, 94, 95 or 96 operates and removes the short circuit from the two respective field rheostats, such as 89 and 85. Relays 97, 98 and 99 also operate when their respective generators G1, G2 or G3 are in operation.

Further, when relay 98 operates, its associated relay 107 also operates and when relay 99 operates, relay 108 operates. The function of relay 107 is to transfer the control effected by voltmeter relay 103, from automatic rheostat 85 associated with generator G1, to automatic rheostat 86 associated with generator G2. Relay 108 in the same manner transfers the control from automatic rheostat 86 to 87. The circuit operation of this control transfer will be explained more in detail further along.

When the voltage of the load circuit rises above or falls below the predetermined value of 23.5, voltmeter 103 operates in one direction or the other and through a chain of relays operates the automatic rheostat of the highest numbered machine in operation to cut in or out resistance in the field circuit of that generator to maintain the voltage of the load circuit within proper limits.

In order to prevent overloading of any generator due to low battery voltage after a power failure or other cause, when the ampere output of the generator reaches 100% of its rating, the contacts of its associated generator ammeters 104, 105, 106, etc., close and prevent the automatic regulator from further increasing the generator voltage until the load on this generator returns to normal.

The circuit operation for controlling the voltage of generator G1 is as follows: When the generator builds its voltage up a sufficient amount, relay 97 operates thereby opening the circuit which maintains the regulator brush of automatic rheostat 85 in its extreme left-hand position, i. e., in such a position that the entire resistance of the rheostat is in series with the hand rheostat and the generator field. The voltage at this moment being low, voltmeter relay 103 will be standing on its left-hand contacts 113, thereby completing an obvious circuit to operate relay 114. With relay 114 operated, an obvious circuit is prepared for the operation of relay 115 under control of the periodically operating interrupter relay 112, which operates at some predetermined rate, for example once every six seconds. When relay 115 operates, a circuit is completed to energize magnet 116 of the automatic rheostat 85 to step its contact arm to the right to cut out resistance in the field circuit of the generator G1. This circuit can be traced from battery, contacts of relay 115, outer right-hand contacts of relay 117, outer right-hand contacts of relay 108, outer right-hand contacts of relay 107, left-hand contacts of relay 120 and winding of magnet 116 to ground. Magnet 116 continues to follow the operation of relays 112 and 115 until the contact arm of rheostat 85 is in its extreme right-hand position, when it opens the circuit of magnet 116. This provided, of course, that voltmeter relay 103 continues to make its low voltage contacts 113. When the voltage rises to about 23.5 volts, the low contacts of voltmeter relay 103 will open, which will stop the movement of the automatic rheostat contact arm and the voltage of the generator will remain steady until conditions again change.

When the voltage of the loaded circuit rises slightly above the predetermined value of 23.5 volts to let us say 23.75 volts the voltmeter relay will close the right-hand contacts 109, thereby completing an obvious circuit to operate relay 110. With relay 110 operated, an obvious circuit is prepared for the operation of relay 111 under control of the interrupter relay 112. When relay 111 operates, a circuit is completed to energize magnet 100 of the automatic rheostat 85 to move its contact arm to the left, one or more steps every six seconds to cut in resistance in the generator field circuit, thereby causing the generator voltage to decrease. When the voltage of the load drops to about 23.65 volts, the voltmeter relay will break its right-hand contacts and the generator voltage will again remain steady until the automatic rheostat is again operated under control of the voltmeter relay 103.

The circuit operation for transferring the generator control of the generator G2, in case the load requires two machines, is as follows: When generator G2 starts, relay 107 operates in an obvious circuit, thereby transferring the control exercised by voltmeter relay 103 and relays 111 and 115 over the automatic rheostat 85 associated with generator G1, to automatic rheostat 86 associated with generator G2. In like manner, when the third generator G3 is started, relay 108 operates to again transfer the control exercised by voltmeter relay 103 from rheostat 86 to rheostat 87.

When relay 107 operates, relay 98 also operates, thereby completing a circuit to energize magnet 116 of rheostat 85 to step its contact arm around its extreme right-hand position, thereby cutting out all of its resistance and allowing generator 61 to carry full load at the voltage for which the manually operated rheostat is adjusted. The circuit for energizing magnet 116 may be traced from battery, right-hand contact of relay 98, back contacts of relay 119, right-hand contacts of relay 97, back contacts of relay 120 and the interrupter contacts and winding of magnet 116 to ground. Likewise when relay 108 is operated, relay 99 is operated which causes magnet 121 of the rheostat 86 to step its arm around to the right and give generator G2 a full field.

As each generator is automatically disconnected, due to a decrease in the load, the voltmeter control exercised by voltmeter relay 103 is transferred to the preceding machine and the automatic rheostat of the disconnected machine is stepped around so that all of the resistance is in series with the generator field.

When generator G1 stops, relay 97 will release and close its left-hand contacts, thereby supplying battery to energize magnet 100 of the associated rheostat 85. This causes the contact arm to be stepped around to its extreme left-hand position, thereby including all the resistance of the rheostat in series with the generator field in which condition it remains until the machine is again started.

*Voltage regulation of auxiliary generator when charging*

By referring to the description of the "automatic recharge" arrangement it will be noted that when the ampere hour meter 60 closed its "start charge" contacts 59, solenoid contactor 65 was operated. The operation of this contactor, in addition to operating contactor 70, also energized contactor 125 which closed its alternate contacts, thereby preparing circuits for actuating the automatic rheostat 88 of the auxiliary generator G4, under control of the voltmeter relay 118 which, it will be noted, is connected directly across the battery 15.

The method of controlling the voltage of generator G4, when charging, is identical with the arrangement described for generators G1, G2, etc., except for the fact that the voltage of the battery and not the voltage across the load circuit is the controlling factor and for this purpose, therefore, the separate voltmeter relay 118 is provided.

It is believed that the control exercised by voltmeter relay 118 over the automatic rheostat 88 will be understood from the drawings in the light of the previous description of the control exercised by voltmeter relay 103 over generators G1, G2, etc., and, therefore, a detailed discussion of this circuit arrangement is unnecessary.

*Counter E. M. F. cell control*

The two counter E. M. F. cells 16a and 16b are normally connected between the battery 15 and the load circuit. In the event that the generators G1, G2, etc., are all disconnected from the load circuit due to a power failure, or for any other reason, these counter E. M. F. cells are automatically short-circuited so as to permit the battery to maintain the load circuit voltage within the proper limits. This operation is controlled by voltmeter relay 75 and a chain of relays which function in the following manner: Voltmeter relay 75 is bridged across the load circuit and if the voltage falls to a predetermined value below the normal load voltage, which in practice may be twenty-one volts, the contact arm of voltmeter relay 75 will close its left-hand or low contacts, thereby energizing relay 76 in an obvious circuit. Relay 76 operates relay 77 which closes a circuit to energize relay 78 which can be traced from ground, contacts of relay 77, resistance 79, left-hand normal contacts of marginal relay 80, winding of relay 78 and winding of relay 80 to battery. Relay 80 being marginal does not operate in series with resistance 79 but relay 78 operates and completes an obvious energizing circuit for the solenoid contactor 81, which, at its outer contacts, short-circuits counter E. M. F. cell 16a and at its inner contacts completes a low resistance substitute circuit for relays 78 and 80 which can be traced from battery, winding of relays 80 and 78, left-hand contacts of relay 78, inner contacts of contactor 81, contacts 82 of relay 83 to ground at the contacts of relay 84. Relay 80 operates in the circuit and prepares a circuit to operate relay 122 to control the counter E. M. F. cell 16b. However, removal of counter E. M. F. cell 16a from the battery circuit will usually increase the voltage of the load circuit sufficiently to cause voltmeter relay 75 to break its left-hand or low contacts, thus permitting relays 76 and 77 to release for the time being.

If the voltage of the load circuit again falls to twenty-one volts, the voltmeter relay will once more make its left-hand or low contacts, thereby again operating relays 76 and 77. Relay 77, in operating, now operates relay 122, the circuit for which can be traced from ground, contacts of relay 77, resistance 79, inner contacts of relay 80, left-hand contacts of relay 83, winding of relay 122 and winding of marginal relay 83 to battery. Relay 83 will not operate in series with resistance 79. Relay 122, in operating, closes an obvious circuit to operate solenoid contactor 123, which at its outer contacts short-circuits counter E. M. F. cell 16b, thereby effectively removing it from the battery circuit. Operation of contactor 123 also closes, at its inner contacts, a substitute circuit to hold relay 122 operated and to energize marginal relay 83. This circuit can be traced from ground, left-hand contacts of relay 84, inner contacts of contactor 123, left-hand contact and winding of relay 122 and winding of relay 83 to battery. Relay 83, in operating closes at its right-hand outer contacts a substitute holding ground for relays 78 and 80 in place of the ground originally supplied at the back contacts of relay 84. Both counter E. M. F. cells 16a and 16b are now short-circuited.

When the voltage of the load circuit rises to a predetermined value, for example 23.5 volts, voltmeter relay 75 will close its right-hand or high contacts, thereby operating relay 124, which in turn operates relay 84, which relay opens the holding circuit for relays 122 and 83, which thereupon release. Relay 122 in releasing releases contactor 123, which removes the short circuit from counter E. M. F. cell 16b, thereby connecting this cell into circuit with the battery. Under normal conditions the voltmeter relay 75 will then break its high contact at least momentarily, thereby releasing relays 124 and 84 to again supply holding ground for relays 78 and 80. When the voltage again rises to 23.5, the right-hand or high contact of voltmeter relay 75 will make once more to operate relays 124 and 84, thereby opening its holding circuit for relays 78 and 80. When relay 78 releases it releases contactor 81 which removes the short circuit from counter E. M. F. cell 16a, and thereby making it into circuit with the battery. The foregoing cycle of operations will be repeated as the voltage of the load circuit fluctuates between the prescribed limits.

What is claimed is:

1. In an electrical system, the combination with a power supply circuit and a load circuit of a plurality of motor generator sets adapted to be connected in parallel between said circuits in a predetermined sequence according to the current flowing in said load circuit, of current responsive means individual to each of said sets and effectively connected in series with said load circuit for controlling the connection of said sets between said circuits and of means comprising a step-by-step selector mechanism responsive to a resumption of said power supply following a failure thereof to introduce a predetermined delay in the sequential connection of the generator sets required by the load circuit.

2. In an electrical system, the combination of a load circuit a source of power, a storage battery and a counter E. M. F. cell in series connected in parallel across the load circuit, a plurality of generators automatically connectible to said power source and to the load circuit in a predetermined sequence in accordance with the current flowing in said load circuit, a reserve generator, a current metering device in the output of said battery adapted to control the starting of said reserve generator and its parallel connection across the terminal of said battery when the battery has discharged a predetermined amount, of means for omitting any one of said plurality of generators from the sequence, for transferring control of the omitted generator to the next generator in the sequence and for rendering ineffective said metering device and of means for establishing a control for said reserve generator to function as an additional generator in the sequence when the current in the load circuit exceeds a predetermined value.

HARVEY T. LANGABEER.
ROBERT L. LUNSFORD.